(12) United States Patent
Murez et al.

(10) Patent No.: US 7,716,239 B2
(45) Date of Patent: May 11, 2010

(54) APPARATUS AND METHOD FOR PERFORMING PROCESS HAZARD ANALYSIS

(75) Inventors: Justin Murez, Houston, TX (US); Patrick C. Berwanger, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 811 days.

(21) Appl. No.: 10/895,169

(22) Filed: Jul. 20, 2004

(65) Prior Publication Data
US 2006/0020604 A1 Jan. 26, 2006

(51) Int. Cl.
*G06F 7/00* (2006.01)

(52) U.S. Cl. ............ 707/779; 707/792; 707/795

(58) Field of Classification Search .......... 707/1–10, 707/100–104.1, 200–201, 736, 770, 779; 705/1, 8, 9; 702/179; 700/19, 21, 83, 203–204, 700/206, 301
See application file for complete search history.

(56) References Cited

U.S. PATENT DOCUMENTS

| | | | | |
|---|---|---|---|---|
| 4,298,955 A * | 11/1981 | Munday et al. | ............. | 700/266 |
| 5,245,554 A * | 9/1993 | Tsuyama et al. | ............. | 702/185 |
| 5,774,372 A | 6/1998 | Berwanger | | |
| 5,799,184 A * | 8/1998 | Fulton et al. | .................... | 707/2 |
| 6,055,551 A * | 4/2000 | Heinlein et al. | ............. | 715/210 |
| 6,094,600 A * | 7/2000 | Sharpe et al. | ................. | 700/19 |
| 6,364,621 B1 * | 4/2002 | Yamauchi | ................ | 417/44.11 |
| 6,366,924 B1 * | 4/2002 | Parce | ....................... | 707/104.1 |
| 6,414,788 B1 | 7/2002 | Ye | | |
| 6,438,484 B1 * | 8/2002 | Andrew et al. | .............. | 701/100 |
| 6,597,973 B1 * | 7/2003 | Barich et al. | .................. | 701/29 |
| 6,647,301 B1 * | 11/2003 | Sederlund et al. | ............. | 700/79 |
| 6,711,906 B2 * | 3/2004 | Pritchard et al. | ............... | 62/93 |
| 6,735,541 B2 | 5/2004 | Kern | | |
| 6,748,400 B2 * | 6/2004 | Quick | ..................... | 707/104.1 |
| 6,823,270 B1 * | 11/2004 | Roys | ........................... | 702/45 |
| 7,173,539 B2 | 2/2007 | Schultz | | |
| 2001/0001851 A1 * | 5/2001 | Piety et al. | .................. | 702/184 |
| 2002/0049625 A1 * | 4/2002 | Kilambi et al. | ................ | 705/9 |
| 2002/0138416 A1 * | 9/2002 | Lovejoy et al. | ............... | 705/38 |
| 2003/0065690 A1 * | 4/2003 | Kelley | ........................ | 708/100 |
| 2003/0114946 A1 * | 6/2003 | Kitchen | ....................... | 700/97 |
| 2003/0233245 A1 * | 12/2003 | Zemore | ......................... | 705/1 |
| 2004/0024567 A1 * | 2/2004 | Whaling et al. | ............. | 702/179 |

(Continued)

OTHER PUBLICATIONS

Faisal I. Khan and S.A.bbasis, OptHAZOP—An Effective and Optimum Approach for HAZOP Study, 1997, pp. 191-204.*

(Continued)

*Primary Examiner*—Miranda Le

(57) ABSTRACT

A software application implementable on a computer system for performing process hazard analysis. The process has a plurality of nodes with equipment, and process data created by external applications is stored in a plurality of external databases on the computer system. A plurality of internal master lists are created for the software application by importing the process data from the external databases into the software application. A node record for each node of the process is compiled by inputting information on the node. The node records for each node are organized according to one of a plurality of guidewords. The node records of the process are reviewable by filtering the node records according to a selected guideword, nodes, equipment, or other process data.

14 Claims, 14 Drawing Sheets

U.S. PATENT DOCUMENTS

| | | | |
|---|---|---|---|
| 2004/0177326 A1* | 9/2004 | Bibko et al. | 715/530 |
| 2005/0027656 A1* | 2/2005 | Tobler et al. | 705/53 |
| 2005/0096759 A1 | 5/2005 | Benjamin | |
| 2005/0149289 A1 | 7/2005 | Whaling | |
| 2005/0251278 A1* | 11/2005 | Popp | 700/110 |
| 2005/0256682 A1* | 11/2005 | Galutia et al. | 702/185 |

OTHER PUBLICATIONS

"PHAWorks 4.1," obtained from http://www.safetyonline.com, generated Nov. 9, 2004, 3-pgs.

"DNV—DNV Pro," obtained from http://www.dnv.com/software/all/dnvPro/index.asp, generated Nov. 9, 2004, 1-pg.

"DNV Pro" Brochure, dated Jan. 2002, 2-pgs.

"PHA-Pro 6," obtained from http://www.dyadem.com/products/pha-pro/index.htm, generated Nov. 9, 2004, 3-pgs.

"PHA-Pro 6 Features," obtained from http://www.dyadem.com/products/pha-pro/pha-pro_features.htm, generated Nov. 9, 2004, 3-pgs.

"PHA-Pro 6 Screenshots," obtained from http://www.dyadem.com/products/pha-pro/pha-pro_screenshots.htm, generated Nov. 9, 2004, 2-pgs.

"PHA-Pro 6" Brochure, dated 2003, 2-pgs.

Matrikon, "Alarm Analysis-Solutions", Nov. 10, 2004, 3 pages, http://www.matrikon.com.

Matrikon, "Alarm Management Benefits", Nov. 10, 2004, 3 pages, http://www.matrikon.com.

Matrikon, "Features of Process Guard", Nov. 10, 2004, 20 pages, http://www.matrikon.com.

Matrikon, "Overview of Process Guard", Nov. 10, 2004, 2 pages.

Matrikon, "Process Alarms Management—Methodology", Nov. 10, 2004, 13 pages, http://www.matrikon.com.

Nikos, "Event Logger Suite Overview", Nov. 10, 2004, 2 pages, http://www.nikosinc.com/elogger.html.

"PAS Announces Automation Asset Management System", Sep. 7, 2004, 2 pages, http://www.pas.com/pressrelease_imoc.htm.

"Product Information Note Uniformance PHD", Jan. 1, 2004, 5 pages, http://www.acs.honeywell.com.

"Uniformance PHD", Nov. 10, 2004, 2 pages, http://www.acs.honeywell.com.

Plant Automated Systems, "AMO Plus", Nov. 10, 2004, 4 pages, http://www.pas.com/AMOPlus.htm.

Plant Automated Systems, "AMO Suite", Nov. 10, 2004, 4 pages, http://www.pas.com/AMOSuite.htm.

Plant Automated Systems, "DOC3000", Nov. 10, 2004, 7 pages, http://www.pas.com/DOC3000.htm.

Plant Automated Systems, "Integrity.MOC", Nov. 10, 2004, 6 pages, http://www.pas.com/IntegrityMOC.htm.

* cited by examiner

130 ⌐ ⎯132 ⎯134

| Guidewords | □ ◻ ☒ |
|---|---|
| Sort ID | Guideword |
| ▶ 1 | No Flow |
| 2 | Reverse Flow |
| 3 | More Flow |
| 4 | Less Flow |
| 5 | More Level |
| 6 | Less Level |
| 7 | More Pressure |

Record: |◀ ◀  1  ▶ ▶|  of 80     Close

| All P&IDs | □ ◻ ☒ |
|---|---|
| P&ID Number | Description |
| ▶ RBD_G0002_MF_01_9 | HDS Charge Pumps 67-E750/E751 |
| RBD_G0002_MF_02_14 | HDS FD Drum 95-EH32 |
| RBD_G0002_MF_03_11 | HDS Fee/Effluent 41-E821 (6) |
| RBD_G0002_MF_04_15 | HDS Reactor 95-EH39 |
| RBD_G0002_MF_05_15 | Charge Furnace Feed System |
| RBD_G0002_MF_06_9 | Charge Furnace Scrubber 95-EH40 |
| RBD_G0002_MF_07_8 | HDS Hi Temp Flash Drum 95-EH35 |

Record: |◀ ◀  1  ▶ ▶|  of 80     Close

| Safeguard Types | |
|---|---|
| Safeguard | Description |
| ▶ Operator Training | Procedures, Maintenance, etc. |
| BPCS | Basic Process Control Systems |
| Indications | Level, Temperature, Pressure, etc. |
| Alarms | Alarms in DCS |
| PRS | Pressure Relief System |
| SIS | Safety Instrumented Systems |
| SOL | Safe Operating Limits |

Record: |◀ ◀ 1 ▶ ▶| of 8

| Risk Rankings | |
|---|---|
| Risk Rank | Description |
| ▶ 0 | N/A |
| 1 | Low Low Frequency, Low Low Consequence |
| 2 | Low Low Frequency, Low Consequence |
| 3 | Low Frequency, Low Low Consequence |
| 4 | Low Frequency, Low Consequence |
| 5 | Low Low Frequency, Medium Consequence |

Record: |◀ ◀ 1 ▶ ▶| of 26

Node 1 Related Equipment — 300, 302, 304

| Equipment Tag No. | Description |
|---|---|
| ▶ 41-E821A ▼ | HDS Feed/Hot Gas Effluent Top W. |
| 95-EH32 ▼ | HDS Feed Tank |
| * ▼ | |

(Double-Click on the Tag Number to add more equipment)

Record: |◀ ◀ 1 ▶ ▶| of 3    [Close]

FIG. 14B

Node 1 Related P&IDs — 320, 322, 324

| P&ID Number | Description |
|---|---|
| ▶ RBD_G0002_MF_01_9 ▼ | HDS Charge Pumps 67-E750/E751 |
| RBD_G0002_MF_02_14 ▼ | HDS FD Drum 95-EH32 |
| * ▼ | |

(Double-Click on the P&IDNumber to add more P&IDs

Record: |◀ ◀ 1 ▶ ▶| of 3    [Close]

FIG. 14C

Node 1 Related Team Members — 360, 362, 364

| Name | Role on PHA Team |
|---|---|
| ▶ Justin Murez ▼ | Leader |
| * ▼ | |

(Double-Click on the P&IDNumber to add more P&IDs

Record: |◀ ◀ 1 ▶ ▶| of 3   [Import Members] [Close] — 366

300

Node 1 Related Equipment

Print Range
- ○ All Nodes
- ○ Current Node
- ○ From Node ☐ to ☐
- ○ Listed Nodes ☐
- ○ Selected Nodes:

```
1
2
3
4
5
6
7
8
9
10
11
12
13
14
15
16
17
```

[ OK ]
[ Close ]

Filters
- ○ No Filters
- ○ Safeguard Type
  ```
  Operator Training
  BPCS
  Indications
  Alarams
  PRS
  ```
- ○ Guideword
  ```
  No Flow
  Reverse Flow
  Less Flow
  More Flow
  Less Level
  ```
- ○ Equipment Tag
  ```
  05-E752  HDS Kettle Product Airf
  05-E753  HDS N High Temp Flas
  05-E754  HDS S H High Temp Air
  05-E755  Condensate Inj Pump C
  ```
- ○ Drawing Number
  ```
  RBD_G0002_MF_01_9
  RBD_G0002_MF_02_14
  RBD_G0002_MF_03_11
  RBD_G0002_MF_04_15
  RBD_G0002_MF_05_15
  ```
- ○ Field Search
  Field ☐
  Contains ☐

FIG. 15

260 — Question

262 — Question: Validation Review of Risk Assessment   Session: 8   Revision: 0

264 — |◀ ◀  Type: Building Sitting Assessment ▼   Question Record 1 of 8  ▶ ▶|

270 — 1. Question    2. Suggestion \ Rating \ Rank — 280

272 — Date: 2/2 8:30AM

Full Question:

274 — Has any new highly hazardous chemical, building, or role occupants been added to this area that would impact the site building siting assessment (flammable materials or toxic release)?

Yes/No
No ▼

Comment:

276 —

Team    Print  Spell    Close

FIG. 16

APPARATUS AND METHOD FOR PERFORMING PROCESS HAZARD ANALYSIS

CROSS-REFERENCE TO RELATED APPLICATIONS

This application is filed concurrently with U.S. Non-provisional application having Express Mail No. EV 277226567 US, Ser. No. 10/895,212, and entitled "Apparatus and Method for Assessing Exceedance of a Process Beyond Safe Operating Limits."

BACKGROUND OF THE INVENTION

1. Field of the Invention

The present invention generally relates to an apparatus and method for performing process hazard analysis and more particularly relates to a software application and databases implementable on a computer system for performing process hazard analysis of a process plant or the like.

2. Description of the Related Art

Referring to FIG. 1, a process 10 is schematically illustrated. Typical, the process 10 may have thousands of pieces of equipment 12, such as valves, vessels, pumps, pressure chambers, relief valves, etc. The equipment 12 is interconnected by piping 14. Each piece of equipment 12 can have several operating parameters, safeguards, overpressure scenarios, or the like.

A Distributive Control System (DCS) 16 is typically used with the process 10. The DCS 16 may automatically control some aspects of the process 10 and may require operators to take action on other aspects of the process 10. The DCS 16 has a plurality of instruments 18 that are positioned in the field, measure process variables, and are wired to the DCS 16. The instruments 18 may be associated with the equipment 12 of the process 10. However, not all pieces of equipment 12 have instruments 18 associated with them. The instruments 18 can be flow indicators, temperature sensors, pressure sensors, etc. The DCS 16 typically has instrument tags assigned for each instrument 18. The instruments tags are numbers identifying the instruments 18 in the process 10. Portions of the process 10, which can include instruments 18 and/or equipment 12, are often referred to as nodes 13 of the process 10.

An Engineering Information Management (EIM) framework 20 is also typically used with the process 10. The EIM framework 20 includes a plurality of external applications 21 and a plurality of databases 22-26, which store process information on a computer or network. The external applications 21 can include a pressure management application, an alarm response analysis application, Lotus Notes, Microsoft Access, or other industry specific software, such as Meridium. The external databases 22-26 of process information created by these external applications 21 include an equipment database 22, safe operating limit database 23, drawing index database 24, Pressure Protection Manager® (PPM®) database 25, and alarm response analysis (ARA) database 26. In the process industry, there is no standard structure for such databases 22-26, and the databases 22-26 can have a variety of different information depending on the process or particular implementation.

The various databases 22-26 of the EIM framework 20 are discussed below. The equipment database 22, which can be created in Lotus Notes, includes details about equipment 12 used in the process 10. For example, the equipment database 22 typically includes an equipment number or tag and a description of the equipment 12 of the process 10. The equipment tag can identify a specific piece of equipment 12 or can provide the functional location of the piece of equipment 12 in the process 10. Furthermore, the equipment database 22 can contain information pertinent to Process Safety Information (PSI) and can contain the source of the PSI information with linked documents.

The safe operating limit (SOL) database 23, which can be created in Lotus Notes or Microsoft Access, includes details of safe operating limits associated with the equipment 12 of the process 10, such as pressures, temperatures, levels, flow rates, compositions, etc. Furthermore, the SOL database 23 identifies the tags of the instruments 18 used to measure the operating limits of the process equipment 12.

The drawing database 24, which can be created in Lotus Notes, includes details of the drawings of the process. The drawing database 24 typically includes numbers, revision dates, and descriptions or titles of the drawings of the process 10.

The PPM database 25 is created by a Pressure Protection Manager® (PPM®) application disclosed in U.S. Pat. No. 5,774,372, which is incorporated herein by reference in its entirety. The PPM database 25 stores information on overpressures caused by equipment 12 and pressure relief devices used in the process 10.

The ARA database 26 can be created in Lotus Notes, for example. The ARA database 26 includes details on alarms for the process 10. The alarms are safeguards for monitoring the process 10. The alarms are defined by tag numbers and can include set points, priorities, required operator response, safety shutdowns, and other information.

Plant safety and the Occupational Safety and Health Administration (OSHA) §1910.119(e)(1) require that a process hazard analysis be periodically performed on processes, such as process 10. The process hazard analysis identifies potential hazards of the process 10 and ensures that adequate safeguards and corrective actions exist for the potential hazards. To analyze the hazards of the process 10, an analysis team uses information from the various databases 22-26 of the EIM framework 20. Considering the magnitude of information on the process 10 and the calculations required, analyzing the process 10 and maintaining its integrity can be extremely difficult using traditional methods of paper, computerized data sheets, and manpower.

Software packages for performing process hazard analysis (PHA) are known in the art. Typical PHA software packages are primarily tools for documenting a hazard analysis. Examples of PHA software packages include PHA Works from Primatech, DNV Pro from DNV, and PHA-Pro® from Dyadem. Existing PHA software packages require the analysis team to input pertinent information about the process 10 directly into free text fields of the software. However, the required process information is typically not easily accessible to the analysis team as it is typically stored in the various databases 22-26, or in other control systems, binders, manuals, and other locations. Accordingly, the team analyzing the process 10 may have to make a number of assumptions about information on the process 10 due to the lack of automation and organization of the process information. For example, the analysis team may assume an alarm is associated with a particular node 13 of the process 10. However, the team may assign the alarm in error because the DCS 16 may actually have the alarm for the instrument 18 disabled. Such errors can lead to improper assessments of the hazards of the process 10. To ensure that a proper alarm is assigned to a point of the process 10, the team may have to contact the control room of the DCS 16 to verify if a particular node 13 has an associated alarm. Such labor-intensive fact finding of process information considerably slows down the analysis. In addition, process information that is not readily available and that must be directly entered into text fields increases the chances of producing errors.

The subject matter of the present disclosure is directed to overcoming, or at least reducing the effects of, one or more of the problems set forth above.

SUMMARY OF THE PRESENT DISCLOSURE

A software application and method implementable on a computer system is disclosed to allow a user to perform a process hazard analysis of a process. The process has a plurality of nodes with equipment and instruments. Process information or data created by external applications is stored in a plurality of external databases on the computer system. Using the disclosed software application, the user creates a plurality of internal master lists for the software application by importing the process data from the external databases into the software application. The user can also export process data from the internal master lists of the software application to the external applications. Using the software application, the user compiles a node record for each grouping of equipment for the process by inputting information on the node. The user also accesses one or more of the plurality of internal master lists created in the software application and associates the process data for each node into the node record. The node records for each node are organized according to one of a plurality of guidewords. Using the software application, the user can review the node records of the process by selecting filter criteria to filter the node records according to a selected guideword, nodes, equipment, or other process data.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 7 illustrates a "Guidewords" screen for creating a master list of guidewords for the process analysis.

FIG. 8 illustrates an "All piping and instrumentation diagrams (P&IDs)" screen for creating a master list of P&IDs for the process analysis.

FIG. 9 illustrates a "Safeguard Types" screen for creating a master list of safeguard types for the process analysis.

FIG. 10 illustrates a "Risk Rank" screen for creating a master list of risk rankings for the project.

FIG. 13D illustrates the node screen having a Suggestion/Rating/Rank tab for recoding additional information related to the node being analyzed.

FIG. 14A illustrates a Related Equipment screen for entering the equipment of the node being analyzed.

FIG. 14B illustrates a Related P&IDs screen for entering the drawings of the node being analyzed.

FIG. 14C illustrates a Related Team Members screen for entering the team members analyzing the node of the process.

FIG. 15 illustrates a Print Node screen for producing customized reports.

FIG. 16 illustrates a Question screen for entering questions when analyzing the node of the process.

Figure 1:
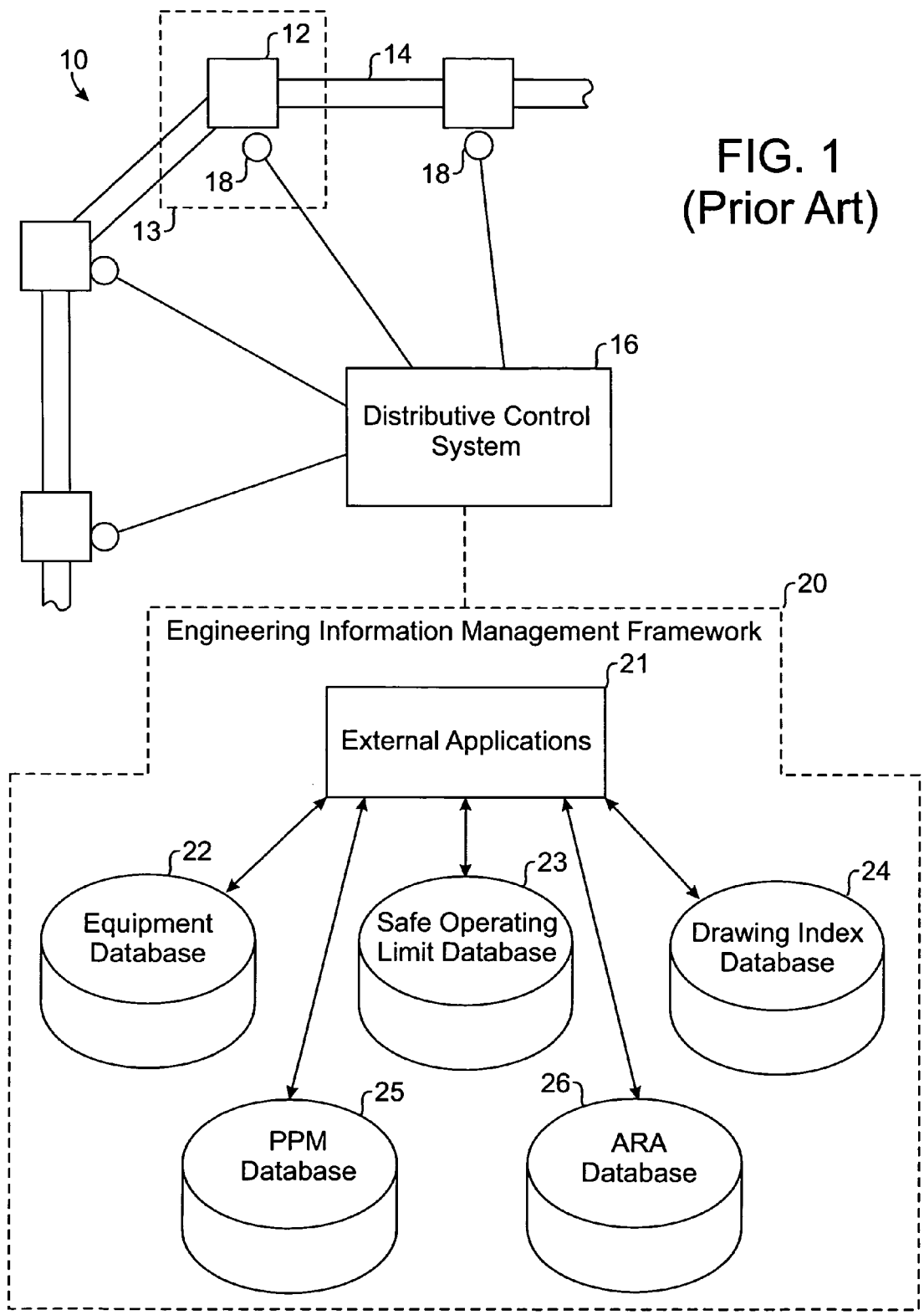
FIG. 1 schematically illustrates a process, a Distributive Control System, and an Engineering Information Management (EIM) Framework according to the prior art.

While the disclosed software application and method of process hazard analysis is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

A. Overview

Figure 2:
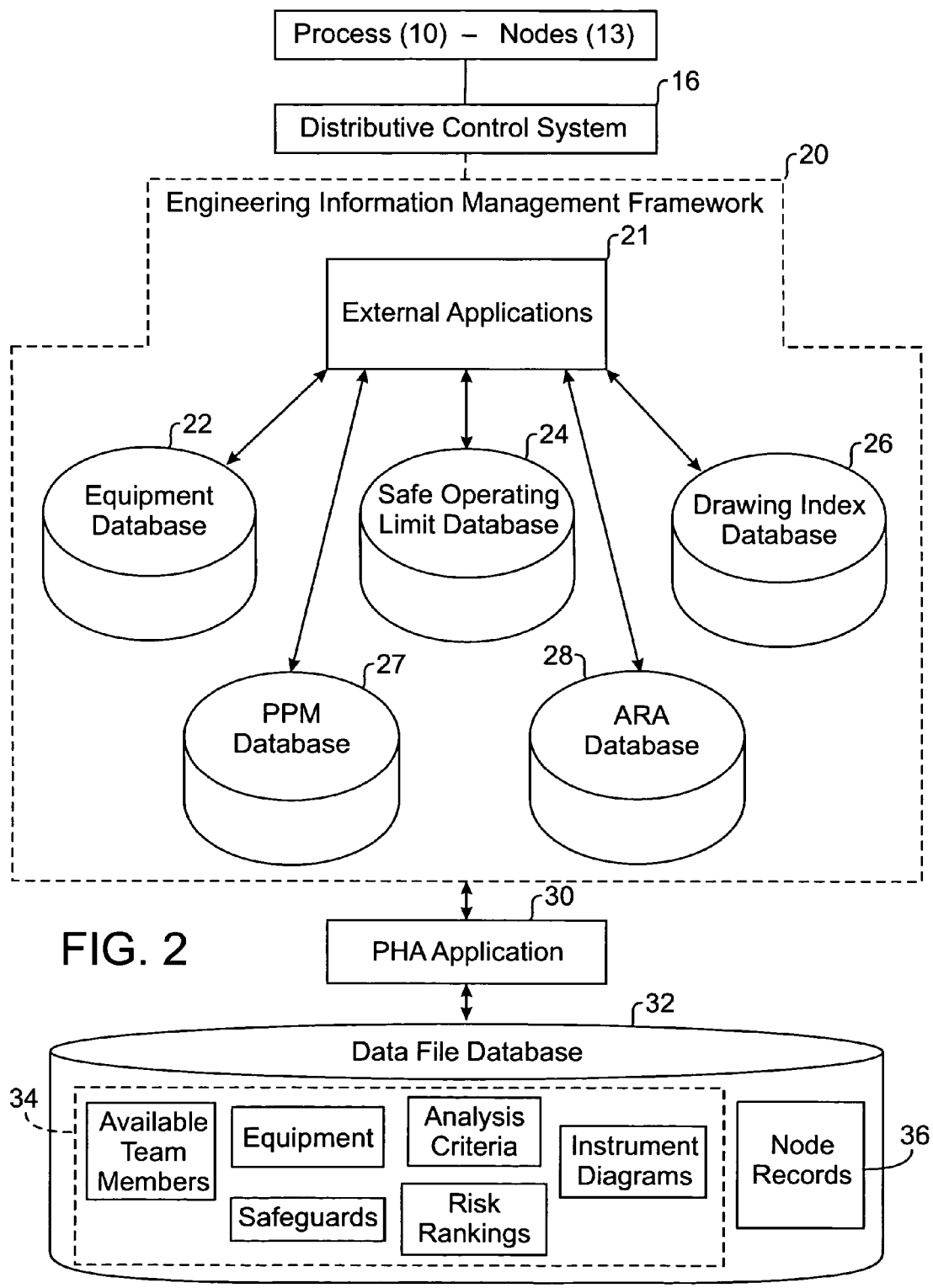
FIG. 2 schematically illustrates an embodiment of a Process Hazard Analysis (PHA) application according to certain teachings of the present disclosure in relation to the system of FIG. 1.

Referring to FIG. 2, an embodiment of a Process Hazard Analysis (PHA) application 30 according to certain teachings of the present disclosure is schematically illustrated. The PHA application 30 is used with a Distributive Control System (DCS) 16 and an Engineering Information Management (EIM) Framework 20. As noted above, the process 10 has piping 14 and a plurality of nodes 13, which include equipment 12 and instruments 18. The DCS 16 monitors and controls the process 10, and the databases 22-26 store information of the process 10. For each process hazard analysis performed, the PHA application 30 creates a data file database 32, which stores process hazard analysis information, as described in further detail below. In one embodiment, the PHA application 30 operates with Microsoft Access 2000, although other programs can be used.

The PHA application 30 is initially loaded with process information from the external databases 22-26. Preferably, the databases 22-26 are relational databases where data is organized as sets of formally described tables from which data can be accessed or reassembled in many different ways. Accordingly, the PHA software 30 preferably interfaces with the relational databases using a structured query language (SQL). In addition, ActiveX® Data Objects (ADO), which is a programming language for interacting with databases, or Lotus NotesSQL, which is an ODBC (Open Database Connectivity) driver for Notes and Domino, can be used to obtain information for the PHA software 30 from these databases 22-26.

Following is a brief overview describing aspects of a process hazard analysis using the PHA application 30. During analysis of the process 10, the PHA application 30 automatically imports process information from the external databases 22-26 and stores the process information within master lists 34 within the data file database 32. The master lists 34 can also be populated manually. These master lists 34, which are discussed in more detail below in FIGS. 5 through 10, include available team members, all equipment, analysis criteria or guidewords, all piping and instrument diagrams (P&IDs), safeguard types, and risk rankings. The process information being imported from the external databases 22-26 represents the "best available" information at the time of the process hazard analysis. Furthermore, obtaining current process information from the existing databases 22-26 and storing it in the master lists 34 ensures that the analysis team using the PHA application 30 can easily access relevant and accurate information about the process 10.

With the master lists 34 created in the data file database 32, the analysis team uses the PHA application 30 to assemble a node template for each of the various nodes 13 of the process 10. The node templates are assembled by automatically associating and populating process information from the master lists 34 to each node template. In general, the node template represents the base record of node 13 and contains the fundamental information of the node, such as related equipment, instruments, safeguards, and operating limits. For example, a given node of the process may have one or more pieces of equipment, such as a valve and a vessel. These pieces of equipment (or more precisely the equipment numbers describing these pieces of equipment) are then obtained from the master lists 34 (namely, the master list 34 for all equipment) and populated in the node template for that node. Likewise, instruments, alarms, safeguards, operating limits, and other process information are also populated into the node template for the particular node 13 from the master lists 34. In this way, the analysis team can assemble comprehensive and up-to-date representations of the nodes 13 of the process 10.

After a node template is automatically created, the analysis team can create one or more node records 36 from each node template by using the fundamental information of each node template. To create the one or more node records 36 for a given node, the node template is preferably made accessible to the user, which then can be recopied numerous times to create the node records 36 of interest. Each of the node records 36 is associated with a particular analysis criterion. Thus, each node record 36 associated with an analysis criterion can be referred to as an analysis record for the node 13. The analysis criteria represent the methodology that the analysis team will use to analyze potential hazards of the process. The analysis criteria used in the example of the present disclosure includes standard guidewords for a Hazard Operability (HAZOP) methodology, which include no flow, reverse flow, more flow, less flow, more level, less level, more pressure, less pressure, etc. Thus, each node record 36 associated with a HAZOP criterion can be referred to as a guideword record for the node 13. As described in more detail below, however, other methodologies can be used for the analysis criteria.

For example, suppose a particular valve is associated with a given node 13 as reflected by its node template. Based on this valve, any instruments, and other equipment associated with the node 13, certain analysis criteria might be of interest, e.g., "no flow" or "reverse flow." Accordingly, the analysis team can make more than one node record from the node template, e.g., one or more for "no flow" and one or more for "reverse flow." Such analysis criteria or guidewords can be selected from the "analysis criteria" master list 34 to form these two node records. Of course, depending on the equipment and other circumstances at the node, other hazards other than "no flow" or "reverse flow" may be of interest, and accordingly, more or fewer node records could be applicable to a given node 13 and node template. Moreover, selection of the analysis criteria may be manually made by the analysis team upon review of the node template, or may be automatic. For example, if the PHA application 30, upon seeing a pump present at a particular node, may assume that "no flow" is a required node record for a given node template, and thus may automatically generate that node record. However, manual generation of the node record based by the analysis team is illustrated herein.

Once created, the node records 36 allow the analysis team to enter additional information that is related to the analysis criteria at issue and is added to supplement the node record 36 as necessary. The additional information includes any causes and consequences related to the hazards indicated by the node information and analysis criteria. For a given node, there may be several causes and consequences for each of the analysis criteria. In the above example of node records having a valve, "no flow" and "reverse flow" may each be caused by failure of the valve to respond to control signals or caused by mechanical malfunction of the valve. Moreover, one consequence for "no flow" at the valve may involve starving a downstream cooling unit of needed cooling fluid, and one consequence for "reverse flow" may involve the over filling of a tank downstream from the valve. The user enters the appropriate causes and consequences for the node 13 in the one or more node records 36.

Once created with the analysis criteria and additional information, the node records 36 allow the analysis team to qualitatively assess the hazard conditions at the node 13. For example, the "reverse flow" node record 36 for the valve might specify to the analysis team that the hazard is of low priority and low risk, but that the valve should be scheduled for servicing within the next three weeks. By contrast, the "no level" node record 36 might indicate that process temperatures downstream from the valve may spiral out of control and that a critical hazard exists at the node 13. Accordingly, the analysis team can assess whether any safeguards (e.g., alarms) assigned to the node 13 are sufficient. In short, the node records 36 allow the analysis team to enter and asses potential process hazards on the basis of information that is current and accurate and that is at least partially automatically generated from data present at preexisting systems (such as DCS 16 and EIM 20).

Lastly, the PHA application 30 enables the analysis team to perform a number of diagnostic steps. For example, the analysis team can use the PHA application 30 to search a completed process hazard analysis and produce customized reports. The customized reports can focus on all the nodes, a set of nodes, or only nodes with a particular piece of equipment, alarm, safeguard, or other process information, for example. The PHA application 30 also enables the analysis team to determine the impact of changes on critical safeguards of the nodes 13 and whether those safeguards or limits need to be updated. For example, the data file database 32 can be searched after changes to the process 10 have been made, and the analysis team can assess those changes in light of potential hazards. In another example, the data file database 32 can be searched after a process hazard analysis is performed to determine whether a particular safeguard is still acceptable in light of a process change.

Moreover, the analysis team can use the PHA application 30 to export process information from the data file database 32 for other uses. For example, assigned safeguards identified in the process hazard analysis can be exported and used in a Layers of Protection Analysis (LOPA). These and other aspects of the PHA application 30 are discussed in more detail below.

B. Embodiment of the Process Hazard Analysis Application

Figure 3:
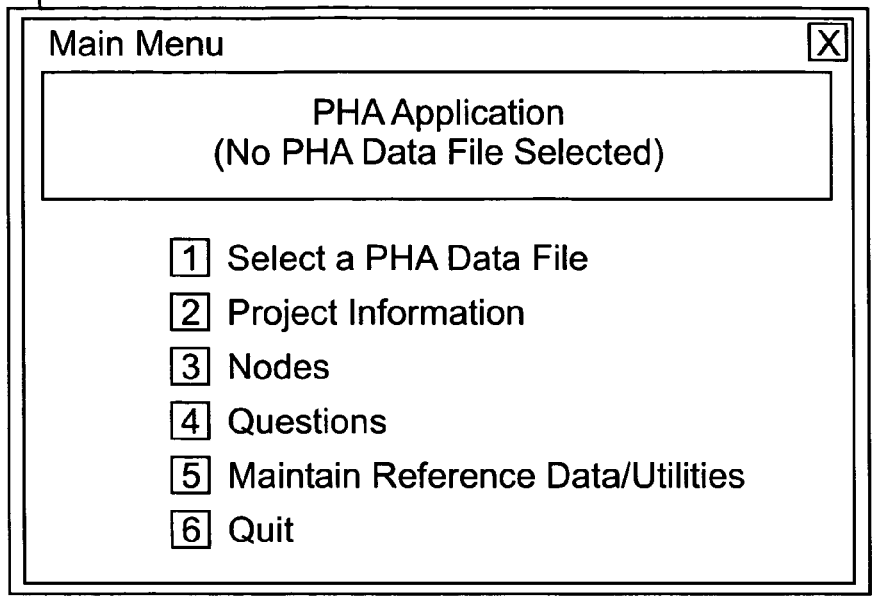
FIG. 3 illustrates a "Main Menu" screen for the application.

The PHA application 30 includes a series of screens having a graphical user interface (GUI) for inputting, accessing, and processing information of the process 10 and EIM framework 20. Referring to FIG. 3, the PHA application first presents a user with a Main menu 100, whose salient features are discussed below.

1. Selecting or Creating a Data File Database

Figure 4:
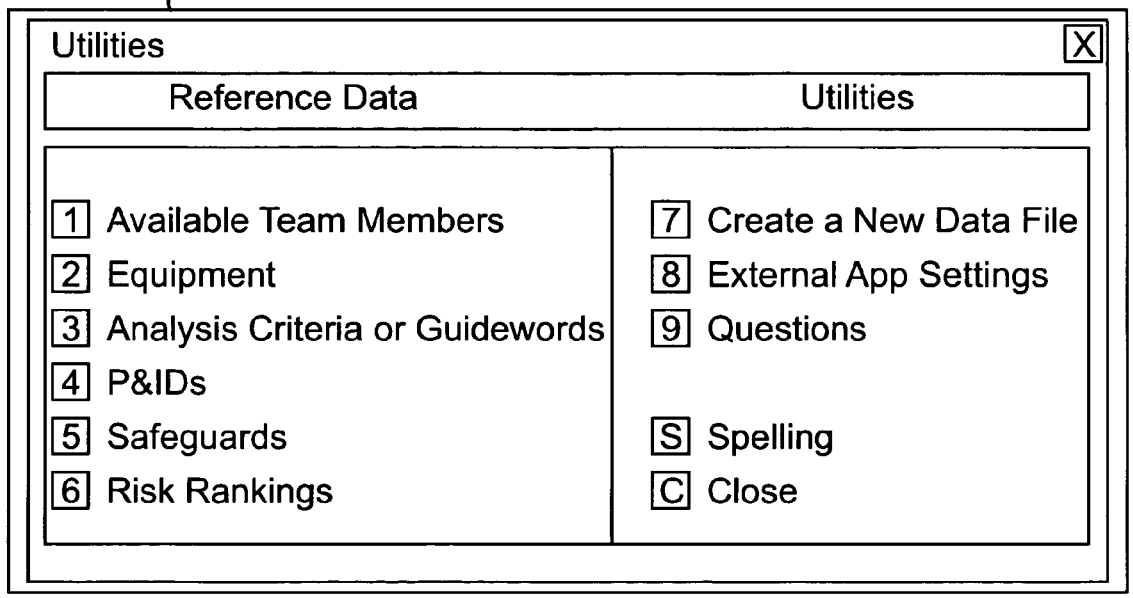
FIG. 4 illustrates a "Utilities" Screen for setting up an analysis project with the application.

When first opened, the PHA application is not associated with a data file database for a particular process hazard analysis. The user can select an existing data file database by selecting option (1) and navigating to locate the existing data file database stored on the user's computer system. Alternatively, the user can create a new data file database by selecting option (5) and accessing a Utilities menu screen 102, which is shown in FIG. 4 and is discussed further below.

2. Creating Master Lists of Process Information

As noted above in the discussion of FIG. 2, the PHA application 30 imports process information from the plurality of external databases 22-26 and creates master lists 34 of various process information. The master lists 34 of process information are used throughout the process hazard analysis, which ensures consistent and accurate input of process information. To import information, the PHA application 30 has a plurality of data entry screens for creating the master lists 34 of process information from the external databases 22-26. The data entry screens for creating the master lists 34 are accessed by selecting options (1)-(6) on the Utilities screen 102 of FIG. 4. For example, the user can access data entry screens to create master lists related to: (1) available team members for the analysis, (2) equipment used in the process, (3) guidewords for analyzing and organizing the process information (e.g., "no flow"), (4) piping and instrumentation diagrams (P&IDs) for the process, (5) safeguards for the process, and (6) risk ranks for the process.

The various data entry screens for creating the master lists 34 are discussed in detail below with respect to FIGS. 5 through 10. In general, the process information of these various data entry screens can be imported from and exported to the external database 22-26 discussed above in FIG. 2. In addition, the process information can be directly input into and deleted from these data entry screens. In one embodiment, deleting an entry from a master list automatically deletes the entry from any other screens that reference the deleted entry.

a. Available Team Member Master List

Figures 5, 6:
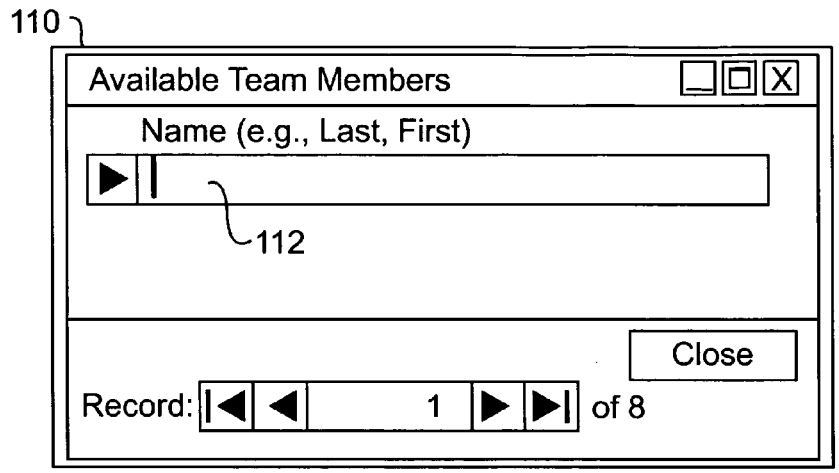
FIG. 5 illustrates an "Available Team Members" screen for creating a master list of available team members for the process analysis.
FIG. 6 illustrates an "All Equipment" screen for creating a master list of equipment for the process analysis.

Referring to FIG. 5, an "Available Team Member" data entry screen 110 enables the user to create a master list of available team members for the process hazard analysis. Team members (or resources) can be manually entered into field 112, or to the extent such team members are resident in the EIM 20, they can be automatically imported (not shown). Ultimately, the team members are stored as a master list 34 in data file database 32, as shown in FIG. 2.

b. Equipment Master List

Referring to FIG. 6, an "Equipment" data entry screen 120 enables the user to create a master list of the equipment used in the process. As noted above, a process may have numerous pieces of equipment. Preferably, the equipment is listed in the master list based upon its functional location name or tag number 122. The master list also contains a verbal description 124 of the equipment. Information to populate the equipment master list is preferably automatically obtained from the equipment database 22 of FIG. 2, but other embodiments may allow for manual entry on screen 120. The equipment master list is again stored in the data file database 32, enabling a user to easily access the equipment information throughout the process hazard analysis, and to select that information numerous times if necessary.

c. Analysis Criteria Master List

Referring to FIG. 7, an analysis criteria or "Guideword" data entry screen 130 enables the user to create a master list of analysis criteria or guidewords for analyzing the process and classifying the various hazards present at the nodes in the process. As discussed earlier, the HAZOP guidewords such as no flow, reverse flow, more flow, less flow, more level, less level, more pressure, less pressure, etc., can populate this master list, although other methodologies known in the art can be used as well, such as Safety Review, Checklist Analysis, Relative Ranking, Preliminary Hazard Analysis, What-If Analysis, What-If Checklist Analysis, Failure Modes and Effects Analysis, Fault Tree Analysis, and Event Tree Analysis. For these other methodologies, words, descriptions, or other criteria of organizing, analyzing, or interrelating the nodes (equipment and instruments) in the process hazard analysis can be used. In one example, failure modes and effects analysis can include analysis criteria related to types of process failures and the effects that those failure cause, such as rupture or valve leakage, for example. In another example, Layers of Protection Analysis (LOPA) can include analysis criteria related mainly to quantitatively taking credit for safeguards. Again, the analysis criteria master list can be imported from a database within EIM 20 if present, or can be manually entered.

d. Flow Sheet and Diagram Master List

Referring to FIG. 8, a "Mechanical Flow sheets or piping and instrumentation diagrams (P&IDs)" data entry screen 140 enables the user to create a master list of drawings and diagrams of the process being analyzed. Preferably, the entries in the list include the full P&ID name or number 142 and specific revision used in the course of the study, which links the findings of the analysis back to specific documents used. The entries also preferably include a verbal description of the P&ID 144. Preferably, such information is automatically pulled from the drawing database 24.

e. Safeguard Master List

Referring to FIG. 9, a "Safeguard" data entry screen 150 enables the user to create a master list of safeguards for the process being analyzed. By default, the safeguards listed preferably include safeguards (e.g., alarms, pressure reliefs, safety systems, safe operating limits, etc.) expected to mitigate most hazards that may occur for the process. However, additional safeguard types can be added to the list. As with other master lists, the safeguard master list may be populated by pulling information from databases in the EIM 20, such as Safe Operating Limit database 23.

f. Risk Ranking Master List

Referring to FIG. 10, a "Risk Rank" data entry screen 160 enables the user to create a master list identifying the risk rankings associated with the process. In the present example, the "Risk Rank" data entry screen 160 includes the 25 combinations of risk rankings found in a ConocoPhillips 5×5 Risk Matrix, which again can be pulled from appropriate databases in the EIM 20 should that information be present.

g. External Application Settings

Figure 11:
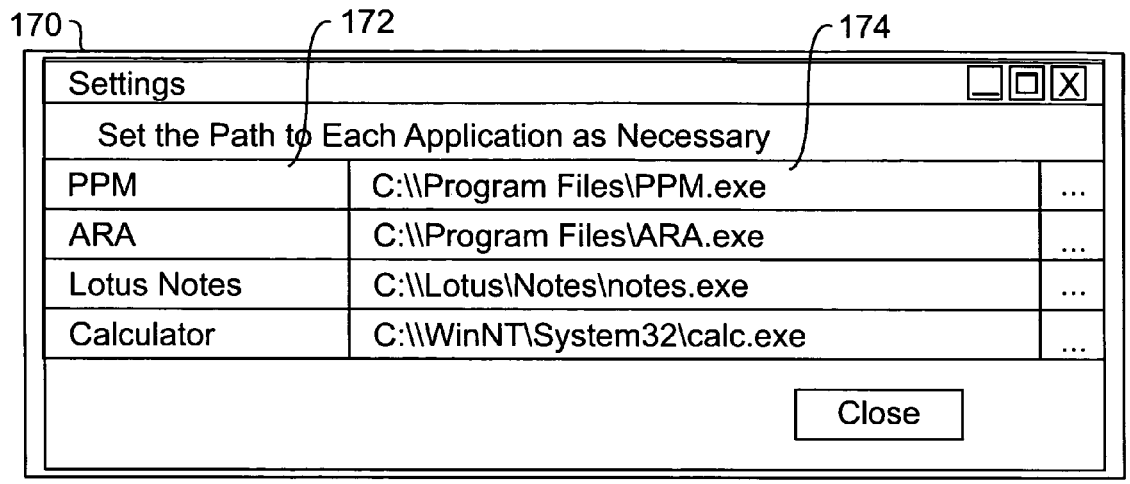
FIG. 11 illustrates a "Settings" screen for creating paths to external applications.

Referring to FIG. 11, an "External Application Settings" data entry screen 170 enables the user to create links for accessing the external applications and the external databases in the EIM 20 from the PHA application 30. These links are used for importing data from and exporting data to these external applications and databases. In the present embodiment, the data entry screen 170 links to three external applications to look up relevant parameters related to identified hazards and safeguards for the process and to populate the master lists 34 as just described. Preferably, the external applications (174) include the Pressure Protection Manager (PPM) application, the Alarm Response Analysis (ARA) application, and a Lotus Notes application, but may include other applications as well. The external application settings table 170 provides the pathway on the computer to the executable files (program files) used to access the data.

As noted above in FIG. 2, the PPM database 25 stores information on the relief system used as safeguards in the process 10. By providing a link to the PPM database 25, the PHA team has access to the as-built parameters of the relief system for the process 10. This can be useful when analyzing potential overpressure scenarios. The Alarm Response Analysis (ARA) database 26 of FIG. 2 includes alarm tags, set points, priorities, required operator response, safety shutdowns, and other information. The ARA database 26 is used to access information about the available alarms in the process along with the associated analysis parameters. The Lotus Notes Link provides a link to many sources of information stored in Lotus Notes databases, such as the equipment database 22, the safe operating limits database 23, and the drawing database 24. The equipment database 22 can be used to obtain the equipment tags that identify a specific piece of equipment or can provide the functional location of the piece of equipment in the process. The safe operating limits database 23 can be used to obtain information related to levels, flow rates, temperatures, pressures, and other process variables that define the safe operating limits of the process. The drawing database 24 can be used to view any revision of the drawings.

3. Performing Process Hazard Analysis with Node Forms

The above discussion focused on the creation and content of the various master lists 34 created by the data entry screens of the PHA application 30. When performing process hazard analysis, these master lists 34 are used repeatedly when organizing and analyzing the numerous nodes 13 of the process 10. Referring to FIGS. 13A-13D, an embodiment of a node form 200 for organizing and analyzing the numerous nodes of the process is illustrated. The node form 200 is accessed from the Main Menu of FIG. 3 by selecting option (3) and constitutes a representation of a particular node record generated from a node template as discussed earlier. In other words, much of the information of the node form 200 is automatically generated from the node template, with additional information (e.g., analysis criteria, cause and consequence information, and risk) added to constitute a node record.

As discussed in more detail below, the node form 200 has a tab (1) for node information shown in FIG. 13A, a tab (2) for cause and consequences shown in FIG. 13B, a tab (3) for safeguards shown in FIG. 13C, and a tab (4) for suggestions shown in FIG. 13D.

Figure 13A:
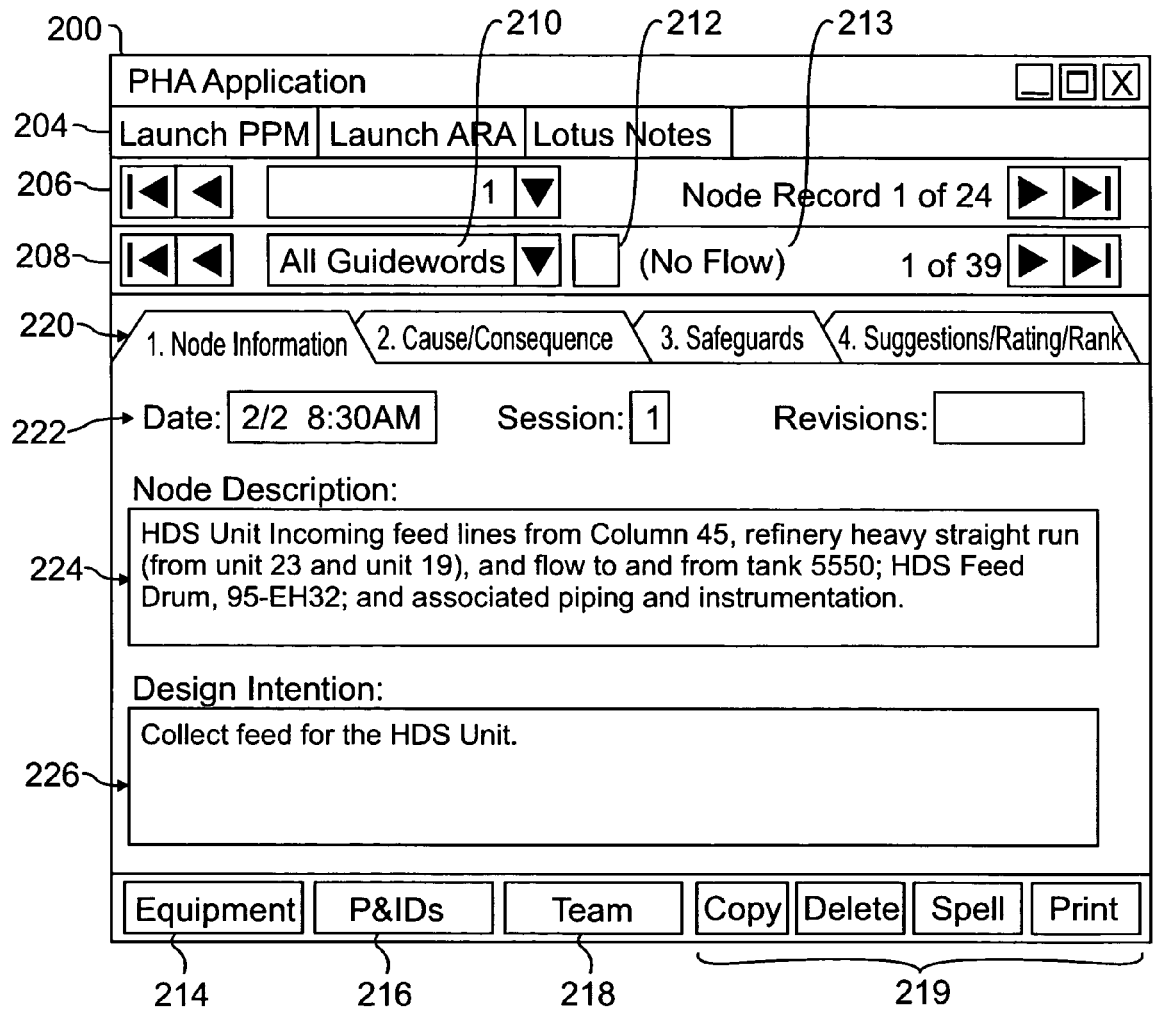
FIG. 13A illustrates a node screen having a node information tab for recording information related to a node of the process being analyzed.

Referring to FIG. 13A, the node information tab (1) allows the user to define and describe the node being analyzed, including parameters such as date information (222), session number and revision dates, node description (224), and design intention (226). In the node description field 224, the user enters a verbal description of the node to which the record pertains, while in the design intention field 226, the user enters a verbal description of the purpose of the piping and equipment that define the node. In addition to tabs (1)-(4), the node form 200 has certain information that is constantly displayed. For example, a typical Windows toolbar (not shown) for Microsoft Access may be displayed. In addition, a toolbar 204 with buttons for launching the external applications is located at the top of the node form 200. (As discussed above with reference to FIG. 11, the locations of these executable files are defined using the Settings screen 170). In the present embodiment of FIG. 13A, the node form 200 includes a button "Launch PPM" for accessing a Pressure Protection Manager (PPM) application and databases, a button "Launch ARA" for accessing the Alarm Response Analysis application and databases, and a button "Lotus Notes" for accessing Lotus Notes and databases. Other buttons can be added to the node form for accessing other executable files that may be needed for a particular process hazard analysis. When needed by the analysis team, these external applications are easily accessible for quick referral of external data. Records for each node are arranged by conventional database techniques and are navigated using navigation buttons 206 and 208.

Using the node form 200, each node of the process can be given one or more node records, as discussed earlier. Depending on the process and the particular equipment, each node record can be associated with an analysis criteria or guideword (e.g., "no flow"), and each node can have one or more records associated with a given analysis criteria or guideword, which is sensible given that each node in the process may contain a number of pieces of equipment. Additionally, each node can have several entries for the same analysis criteria or guideword because each node may present more than one hazard. For example, a node of the process may have five pieces of equipment with implicit piping, and there may be several causes and consequences for "no flow" for the pieces of equipment.

In any event, using a selection 208 on the node form 200, the user can organize and access the node records for each node of the process having the selected analysis criterion or guideword. A pick list 210 is provided to allow the user to select the guideword 213 for the analysis criteria of interest, and may include other features to allow the guidewords (and hence node records) to be selected or manipulated in logical fashions. For example, all node records for the node of interest can be displayed ("all guidewords"), or only those node records corresponding to a particular guideword ("no flow").

As further shown in FIG. 13A, certain buttons at the bottom of the node form 200 are preferably always displayed with the node records, which include an Equipment button 214, a P&IDs button 216, a Team Button 218, and other common buttons 219. Using these buttons, the user can access one or more screens for associating information related to the node record from the plurality of master lists 34 stored in the data file database 32. Using these related screens, the user defines information of the node for searching purposes and for better understanding of the specifics at issue for a given node whose node record is currently being displayed.

The Equipment button 214 in FIG. 13A causes a related equipment screen 300 as shown in FIG. 14A to be displayed. The equipment screen 300 contains equipment information (tag number 302 and description 304) for relevant equipment from the equipment master list (FIG. 6) associated to the node record at issue. The equipment information in the screen 300 allows the user to better define the node record. In diagnostic steps of the process hazard described below, the equipment information enables the user to search the various node records for a particular piece of equipment.

In a similar fashion, the P&IDs button 216 and the Team Button 218 of FIG. 13A respectively causes a related P&IDs screen 320 shown in FIG. 14B and a related Team Members screen 360 shown in FIG. 14C to be displayed. For example, the drawing screen 320 allows the user to associate drawing information (drawing number 322 and description) for relevant equipment from the drawing master list (FIG. 8) pertinent to the node record at issue. Other helpful features can also be added. For example, and referring to the team resources screen 360 of FIG. 14C, the user can define (364) the roles different team members played in analyzing the node, or import team members (366) from existing nodes to populate the information of these fields easily.

Figure 13B:
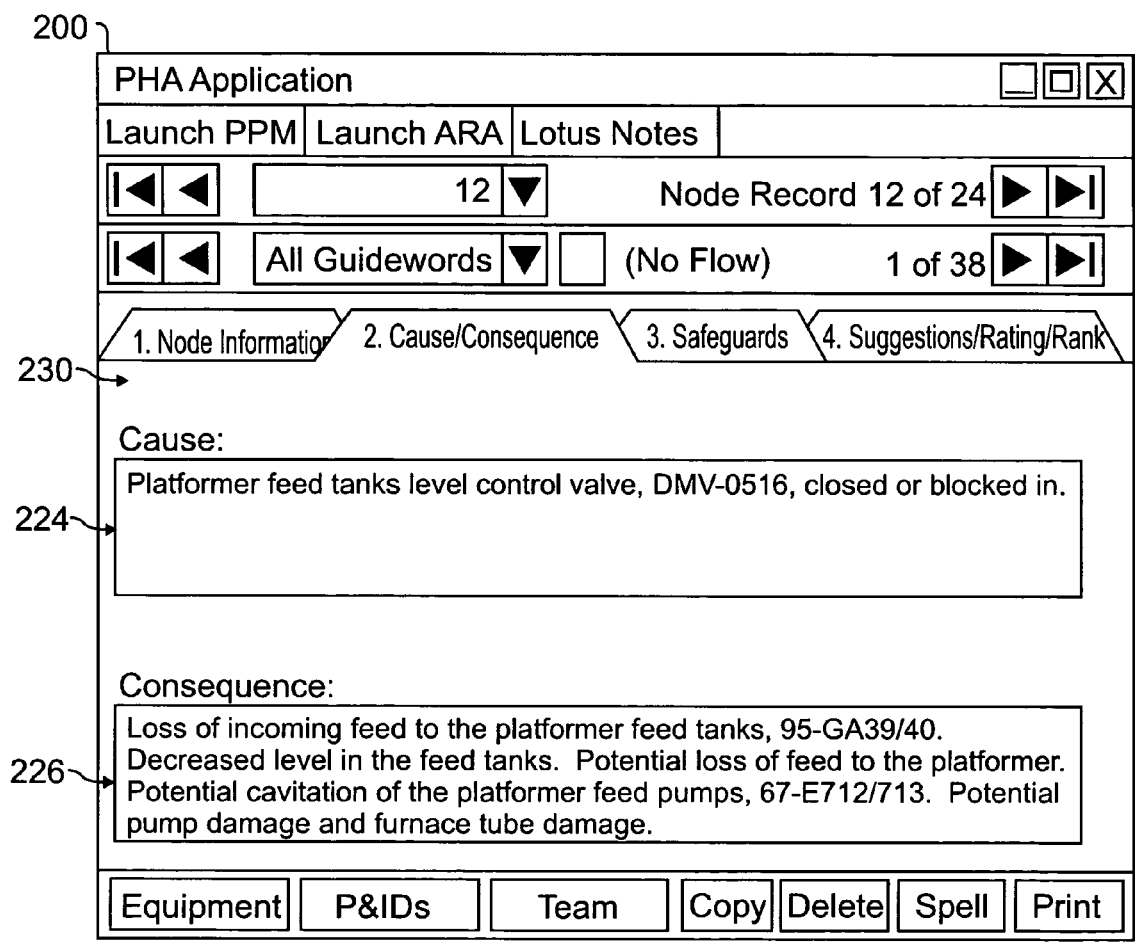
FIG. 13B illustrates the node screen having a Cause/Consequence tab for recording causes and consequences of the guideword for the node being analyzed.

FIG. 13B illustrates the Causes/Consequences tab (2) of the node form 200, which allows the user to access or describe causes and consequences related to the assigned guideword of the node being analyzed. The Causes/Consequences tab (2) includes a cause field 232 and a consequence field 234. In the cause field 232, the user explains an event at the node that may lead to the guideword 213 associated with the record of the node. In the consequence field 234, the user explains what consequences may result from the listed cause so that the analysis team may input or understand the magnitude of the problem.

For example, the node record 200 in FIG. 13B pertains to a node of the process having a level control valve, DMV-0516, for a platformer feed tank. The cause of the "no flow" for the level control valve is described or retrieved by the analysis team in the cause field 232, e.g., because the level control valve is closed or blocked in. The consequence of the "no flow" for the level control valve, as displayed in 234, reveals that the closed or blocked level control valve will cause loss of incoming feed to the platformer feed tank, which will decrease the level of the tank and may damage pumps and furnace tubes downstream in the process.

Figure 13C:
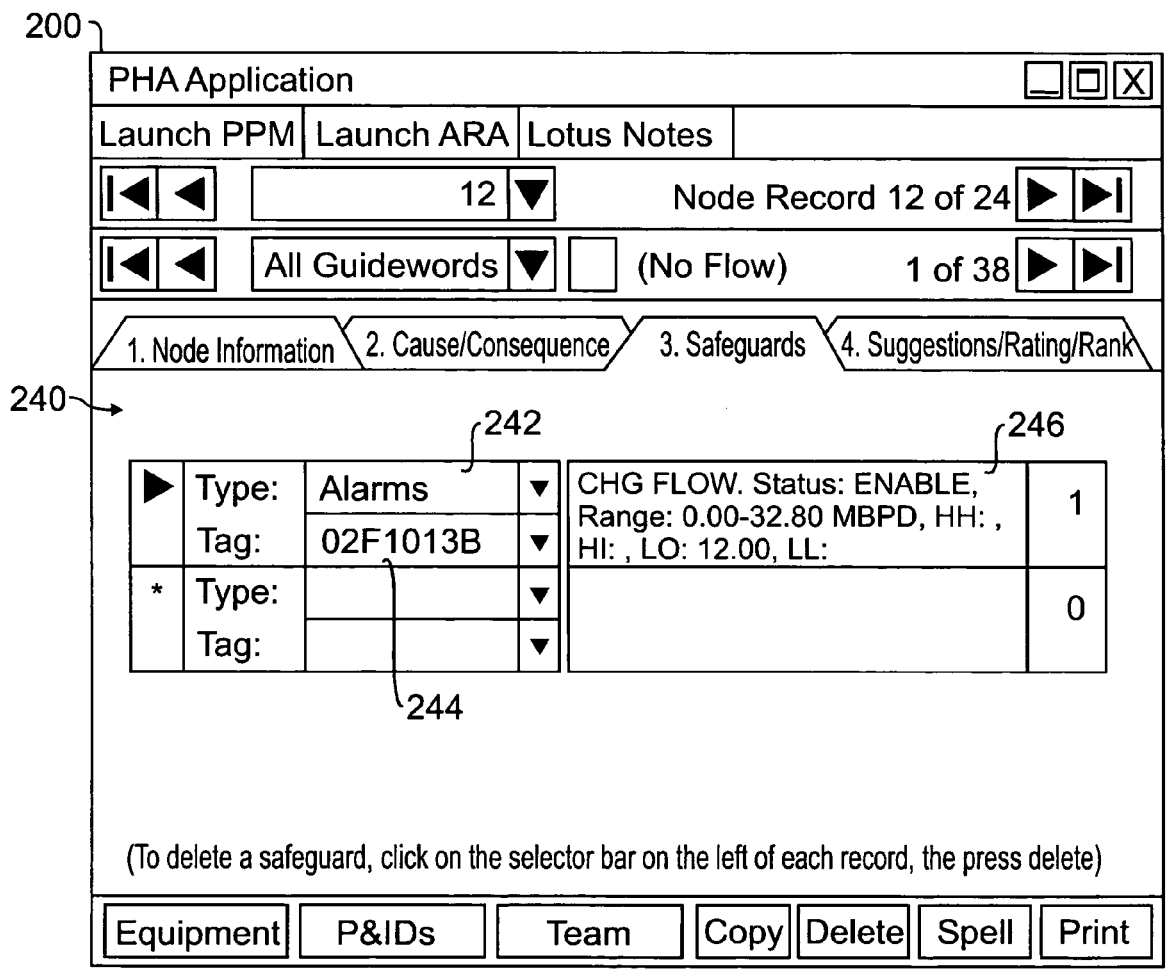
FIG. 13C illustrates the node screen having a Safeguard tab for recoding safeguards for the node being analyzed.

FIG. 13C illustrates the Safeguards tab (3) of the node form 200, which includes data entry fields 242, 244, and 246 to input safeguards for the node and to associate alarms or other safeguards with the node record. The safeguards are measures intended to prevent the specific cause associated with the guideword of the current node record, and can be imported from sources such as the safe operating limit database 23, the PPM database 25, and the ARA database 26 (see FIG. 2). Common safeguards include Pressure Relief System (PRS), Safety Instrumented Systems (SIS), Operator Training, Basic Process Control Systems (BPCS), Indications, Alarms, Safe Operating Limits (SOL), etc. Such safeguard types can be defined by the master list of FIG. 9, and are chosen from a pick list 242. Information 246 about that specific safeguard is preferably automatically populated, but again may be input by the user. For example, set points, priorities, a description, and the instrument range can be automatically populated when a specific alarm is assigned as a safeguard.

For example, if the guideword 213 is "No Flow", an alarm 242 is assigned as a safeguard. When the alarm safeguard 242 is assigned, a list of alarm tags will be available in the tag pick list 244. When a specific tag 244 is chosen, the corresponding alarm information (description, set points, instrument range, etc.) 246 are displayed. This ensures that the analysis team has the most accurate and comprehensive information available for the safeguards. The analysis team can then review and recommend an update for the alarm set point and priority if needed.

Figure 13D:
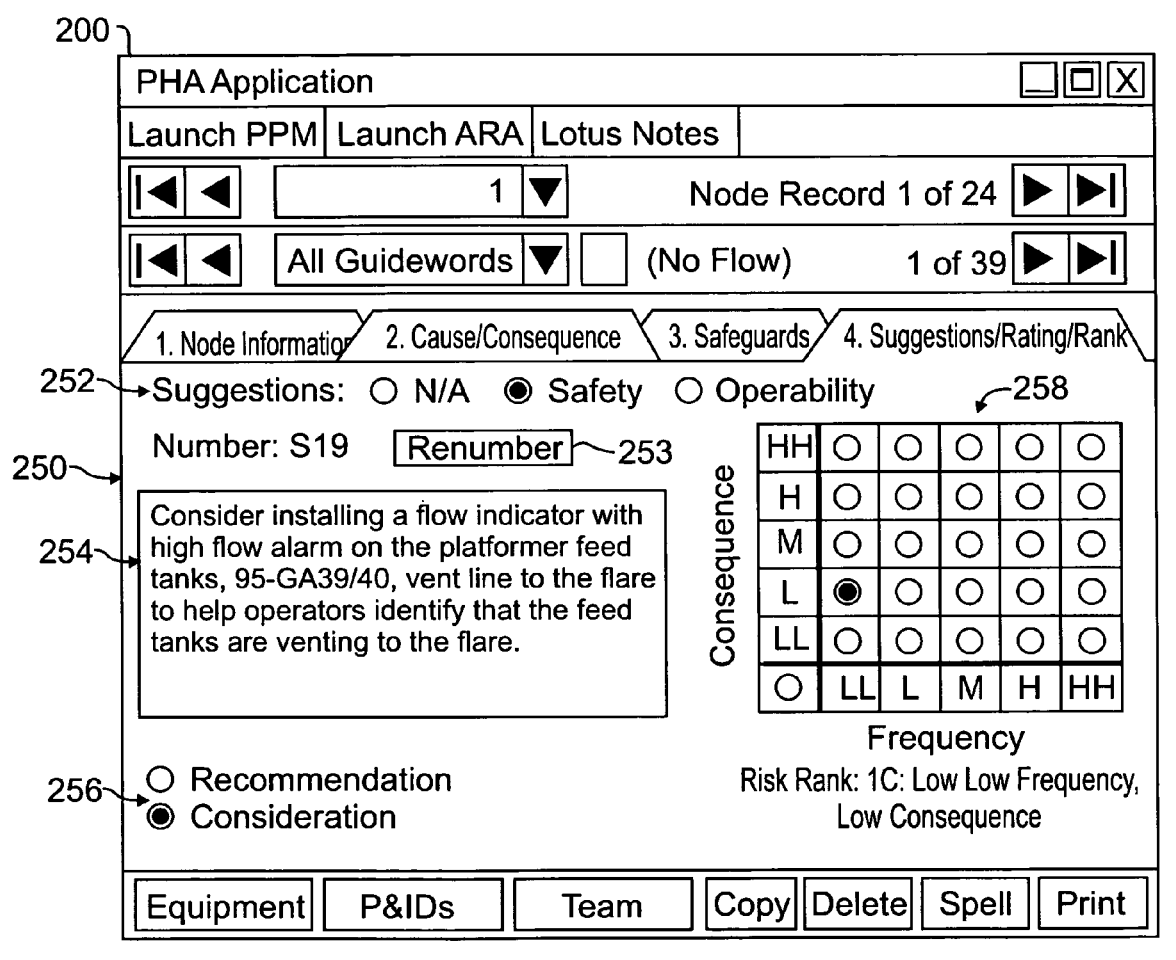

FIG. 13D illustrates the Suggestion/Rating/Rank tab (4) of the node form 200, which includes suggestion fields 252 and 254, a recommendation/consideration selection 256, and a risk matrix 258. The Suggestion/Rating/Rank tab (4) allows the user to retrieve or input suggestions for preventing the hazards described in the node record and for ranking the risk associated with the hazard. In the suggestion fields 252 and 254, the user can input comments or concerns about the guideword record discussed. Often, suggestions are made when the safeguards are inadequate or may need to be changed.

In the present embodiment, the suggestions 252 can be designated as generic (N/A), or deemed pertinent to safety or operability. Suggestions 252 designated as Safety and Operability will be numbered with a prefix of "S" or "O" by the application, subject to possible renumbering (253) by the user. This will provide a count of how many suggestions of each type have been entered. This also allows the user to refer to the suggestions in reports by the associated number. The safety and operability suggestions 252 will be numbered automatically when added or deleted. If the suggestion 252 is safety related, the risk matrix 258 is activated to capture the associated risk of an event that may occur. The user can also categorize the safety suggestion 252 as a recommendation or a consideration 256. A recommendation 256 should be given higher priority for review compared to a consideration.

The print button 219 on the node form 200 brings up a report customization screen 380 shown in FIG. 15. The user can select a print range 382 to print all nodes, the current node, a selected range of nodes, a list of particular nodes, or selected nodes. In addition, the user can select from a plurality of filters to filter the node records and to customize a report. The filters 384 include no filter, safeguard type, analysis criteria or guideword, equipment tag, drawing number, and field search.

Figure 12:
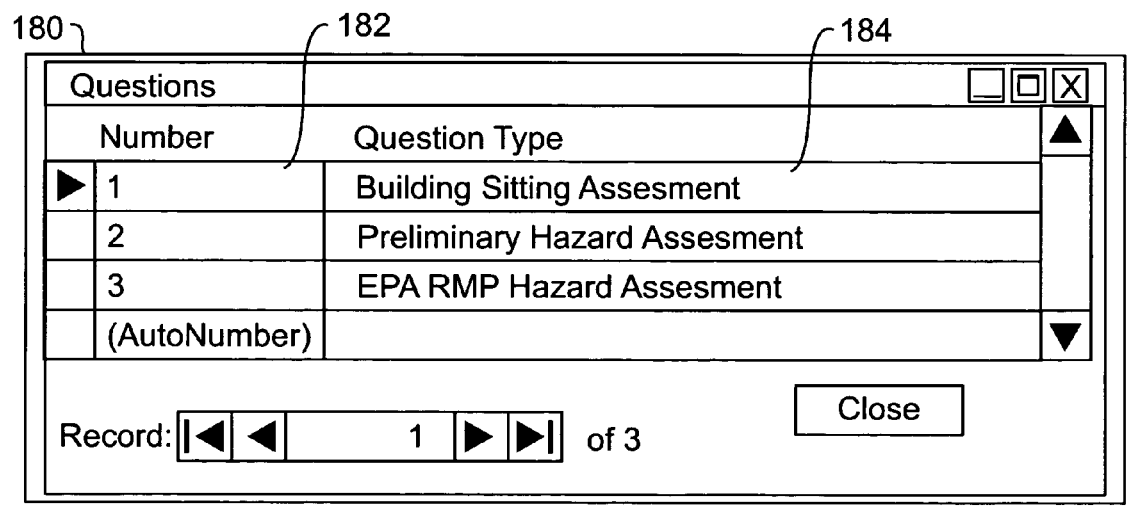
FIG. 12 illustrates a screen for creating a master list of question types and descriptions.

FIG. 16 illustrates a Question form 260 for the user to enter questions related to the process hazard analysis. The question form 260 can be accessed from the Main menu 100 of FIG. 3 or the Utilities menu of FIG. 4. The question tab 270 is used to display each question record. The user first selects the question type 264, which can be a default or user specified type defined in the question type screen 180 of FIG. 12. The user enters a question in the question entry field 274. In addition, the question form 260 has a field 276 for comments. The questions raised by the analysis team may require additional follow-up during session breaks or after the PHA has concluded. The questions in the question entry field 274 can also be used to address general questions that could not be specifically addressed in the node format. The Suggestion/Rating/Rank tab 280 is substantially similar to that of the node form 200 of FIG. 13D.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer-implemented method for performing process hazard analysis to identify and report on potential hazards of a process having a plurality of interconnected nodes, wherein the nodes comprise one or more pieces of equipment with the potential of having one or more types of hazards, the method comprising:

providing a plurality of master lists for performing process hazard analysis created by importing information from a plurality of sources and storing the information within the plurality of master lists in a data file of a computer, wherein said plurality of master lists comprise an equipment list comprising imported equipment information for a process, a safeguard list comprising imported safeguard information about mitigating process hazards, and an analysis criteria list comprising a plurality of imported guidewords from a particular predefined analysis methodology for classifying a plurality of types of hazards for the process;

transforming the information from the plurality of sources into analysis records for performing process hazard analysis, comprising:

assembling a node template for each individual node of the process by retrieving data from the plurality of master lists for the individual node and populating the node template with the data, wherein the data in the node template comprises equipment information for each piece of equipment at the node;

for each of the plurality of guidewords classifying the plurality of possible types of hazards of the process creating analysis records by:

(i) selecting a current guideword from the plurality of guidewords, wherein the plurality of guidewords comprising the plurality of hazard operability (HAZOP) criterion for processes related to flow comprise no flow, reverse flow, more flow, less flow;

(ii) creating the analysis record by copying the node template into the analysis record for each piece of equipment at the node, (iii) supplementing each analysis record with further data from the safeguard list comprising causes and consequences, and (iv) associating each created analysis record with the selected current guideword, so that one or more analysis records are created for the node and associated with the guideword;

generating an interactive node form for performing and reporting process hazard analysis, the node form comprising user-selectable analysis criterion by guideword for organizing and displaying analysis records for each node of the process by guideword; and displaying the analysis records for each node of the process by guideword in response to a user-selection, thereby allowing the process hazard analysis to be consistent with the particular predefined analysis methodology.

2. The computer-implemented method of claim 1 wherein the user-selectable analysis criterion of the node form provides for selection by a particular guideword resulting in the display of only the analysis records associated with that guideword.

3. The computer-implemented method of claim 1 wherein the user-selectable analysis criterion of the node form provides for selection by all guidewords resulting in the display of all analysis records associated with all guidewords.

4. The computer-implemented method of claim 1 wherein said plurality of master lists further comprise a risk ranking list comprising imported risk rankings.

5. The computer-implemented method of claim 4 further comprising supplementing each analysis record with further data from the risk ranking list comprising risk rankings.

6. The computer-implemented method of claim 1 wherein the plurality of guidewords comprise a plurality of hazard operability (HAZOP) criterion for the process in accordance with a HAZOP analysis methodology.

7. The computer-implemented method of claim 1 wherein the plurality of guidewords are based on analysis methodologies selected from one of Layers of Protection Analysis, Safety Review, Checklist Analysis, Relative Ranking, Preliminary Hazard Analysis, What-If Analysis, What-If Checklist Analysis, Failure Modes and Affects Analysis, Fault Tree Analysis, and Event Tree Analysis.

8. A system for performing process hazard analysis to identify and report on potential hazards of a process having a plurality of interconnected nodes, wherein the nodes comprise one or more pieces of equipment with the potential of having one or more types of hazards, the system comprising:

a process hazard analysis (PHA) application in a computer having a processor and associated with a data file database for a particular process hazard analysis, said PHA application providing a plurality of master lists for performing process hazard analysis created by importing information from a plurality of external databases having information about a process and storing the information within the plurality of master lists in the data file database, wherein said plurality of master lists comprise an equipment list comprising imported equipment information for a process, a safeguard list comprising imported safeguard information about mitigating process hazards, and an analysis criteria list from a particular predefined analysis methodology comprising a plurality of imported guidewords for classifying a plurality of types of hazards for the process;

said PHA application transforming via the processor the information from the plurality of databases into analysis records for performing process hazard analysis, comprising:

automatically assembling a node template for each individual node of the process by retrieving data from the plurality of master lists in the data file for the individual node and populating the node template with the data, wherein the data in the node template comprises equipment information for each piece of equipment at the node;

for each of the plurality of guidewords classifying the plurality of possible types of hazards of the process creating analysis records by (i) selecting a current guideword from the plurality of guidewords, wherein the plurality of guidewords comprising the plurality of hazard operability (HAZOP) criterion for processes related to flow comprise no flow, reverse flow, more flow, less flow;

(ii) creating the analysis record by copying the node template into the analysis record for each piece of equipment at the node, (iii) supplementing each analysis record with further data from the safeguard list comprising causes and consequences, and (iv) associating each created analysis record with the guideword, so that one or more analysis records are created for the node and associated with the guideword; and generating an interactive node form displayed on a screen for performing and reporting process hazard analysis, the node form comprising user-selectable analysis criterion by guideword for organizing and displaying analysis records for each node of the process by guideword; and displaying on the screen analysis records for each node of the process by guideword in response to a user-selection, thereby allowing the process hazard analysis to be consistent with the particular predefined analysis methodology.

9. The system of claim 8 wherein the user-selectable analysis criterion of the node form provides for selection by a particular guideword resulting in the display of only the analysis records associated with that guideword.

10. The system of claim 8 wherein the user-selectable analysis criterion of the node form provides for selection by all guidewords resulting in the display of all analysis records associated with all guidewords.

11. The system of claim 8 wherein said plurality of master lists further comprise a risk ranking list comprising imported risk rankings.

12. The system of claim 11 further comprising supplementing each analysis record with further data from the risk ranking list comprising risk rankings.

13. The system of claim 8 wherein the plurality of guidewords comprise a plurality of hazard operability (HAZOP) criterion for the process in accordance with a HAZOP analysis methodology.

14. The system of claim 8 wherein the plurality of guidewords are based on analysis methodologies selected from one of Layers of Protection Analysis, Safety Review, Checklist Analysis, Relative Ranking, Preliminary Hazard Analysis, What-If Analysis, What-If Checklist Analysis, Failure Modes and Affects Analysis, Fault Tree Analysis, and Event Tree Analysis.

* * * * *